United States Patent
Ponzini et al.

(10) Patent No.: US 10,284,324 B2
(45) Date of Patent: May 7, 2019

(54) METHODS AND APPARATUS FOR MULTIPLEXING AND DEMULTIPLEXING SIGNALS

(71) Applicant: Telefonaktiebolaget LM Ericsson (publ), Stockholm (SE)

(72) Inventors: Filippo Ponzini, Pisa (IT); Fabio Cavaliere, Pisa (IT); Luca Giorgi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/569,343

(22) PCT Filed: Apr. 27, 2016

(86) PCT No.: PCT/EP2016/059443
§ 371 (c)(1),
(2) Date: Oct. 25, 2017

(87) PCT Pub. No.: WO2016/174110
PCT Pub. Date: Nov. 3, 2016

(65) Prior Publication Data
US 2018/0316457 A1     Nov. 1, 2018

(30) Foreign Application Priority Data

Apr. 27, 2015   (WO) .................. PCT/EP2015/059100

(51) Int. Cl.
*H04J 14/02*   (2006.01)
*H04L 5/02*    (2006.01)
(Continued)

(52) U.S. Cl.
CPC .......... *H04J 14/0298* (2013.01); *H04L 5/023* (2013.01); *H04L 27/34* (2013.01); *H04B 10/2575* (2013.01); *H04J 14/02* (2013.01)

(58) Field of Classification Search
CPC ...... H04J 14/0298; H04L 5/023; H04L 27/34; H04B 10/2575
(Continued)

(56) References Cited

U.S. PATENT DOCUMENTS 6,480,236 B1   11/2002  Limberg
6,754,238 B1 *  6/2004  Lentine ................. H04L 41/00
                                                370/477
(Continued)

OTHER PUBLICATIONS

Unknown, Author, "NanoSpeedTM 1x2 Solid-State Variable Fiberoptic Splitter", Agiltron Inc, Aug. 26, 2015, 1-3.
(Continued)

*Primary Examiner* — Juan A Torres
(74) *Attorney, Agent, or Firm* — Murphy, Bilak & Homiller, PLLC

(57) ABSTRACT

A method in a node of a telecommunication network comprises receiving a digital communication signal from a first signal source, source, wherein the digital communication signal comprises a wherein the digital communication signal comprises a plurality of low amplitude windows, step 101, and receiving one or more analog subcarrier signals from a second signal source, step 103. The method further comprises multiplexing the one or more analog subcarrier signals into one or more of the plurality of low amplitude windows of the digital communication signal, step 105.

24 Claims, 15 Drawing Sheets

(51) Int. Cl.
*H04L 27/34* (2006.01)
*H04B 10/2575* (2013.01)

(58) Field of Classification Search
USPC .......................................................... 398/76
See application file for complete search history.

(56) References Cited

U.S. PATENT DOCUMENTS

| | | |
|---|---|---|
| 2005/0074037 A1 | 4/2005 | Rickard et al. |
| 2007/0147848 A1 | 6/2007 | Vieira et al. |
| 2010/0098195 A1* | 4/2010 | Nekhamkin ........ H04L 27/0014 375/344 |
| 2012/0207477 A1 | 8/2012 | Takeguchi et al. |

OTHER PUBLICATIONS

Unknown, Author, "RBS 6000 Commercial Description", Ericsson AB, Nov. 27, 2014, 1-75.

* cited by examiner

METHODS AND APPARATUS FOR MULTIPLEXING AND DEMULTIPLEXING SIGNALS

TECHNICAL FIELD

The embodiments described herein relate to methods and apparatus for multiplexing and demultiplexing signals, and in particular to methods and apparatus for multiplexing and demultiplexing digital and analog signals, for example analog 3GPP signals and digital Wi-Fi signals.

BACKGROUND

In the field of telecommunications, the use of small-cells in high capacity radio access networks is becoming more and more significant. Going forward, a large proportion of radio access traffic will be generated indoors (for example in offices, homes, shopping malls, etc.). Access to high speed and high performance telecommunication networks, for example $3^{rd}$ Generation Partnership Project (3GPP) networks such as High Speed Packet Access (HSPA) networks or Long Term Evolution (LTE) networks will coexist in a more efficient way with other local communication networks, such as those having Wi-Fi traffic (e.g. 802.11x).

Common backhaul lines for 3GPP traffic and Wi-Fi traffic is highly desirable, and today most of the small radio base station solutions are able to also provide Wi-Fi service. This trend, in having common infrastructure for all the network services, will continue in the future, when different radio technologies and services will coexist under the common umbrella of 5G.

In some systems having combined 3GPP and Wi-Fi traffic, a common Ethernet link can be used to backhaul both 3GPP and Wi-Fi traffic from an aggregation node at a small-cell site. The use of such a common Ethernet link requires 3GPP and Wi-Fi processing at the small-cell site, and in particular baseband processing of the 3GPP traffic at the small-cell site, which can present drawbacks.

SUMMARY

It is an aim of the present invention to provide a method and apparatus which obviate or reduce at least one or more of the disadvantages mentioned above.

According to a first aspect there is provided a method in a node of a telecommunication network. The method comprises receiving a digital communication signal from a first signal source, wherein the digital communication signal comprises a plurality of low amplitude windows. The method comprises receiving one or more analog subcarrier signals from a second signal source. The one or more analog subcarrier signals are multiplexed into one or more of the plurality of low amplitude windows of the digital communication signal.

This has as advantage, for example, of allowing a digital communication signal, for example a Wi-Fi communication signal which has been converted into a high speed digital signal, such as a GigaBit Ethernet (GbE) digital signal for digital backhaul, to be combined with one or more analog subcarrier signals, for example analog subcarrier signals relating to analog radio signals of a 3GPP telecommunication network, for example HSPA or LTE networks.

According to another aspect there is provided a multiplexer apparatus comprising a combining module. The combining module comprises a first input node coupled to receive a digital communication signal from a first signal source, wherein the digital communication signal comprises a plurality of low amplitude windows. The combining module comprises a second input node coupled to receive one or more analog subcarrier signals from a second signal source. The combining module is configured to multiplex the one or more analog subcarrier signals into one or more of the plurality of low amplitude windows of the digital communication signal. The combining module further comprises an output node to output the multiplexed signal.

According to another aspect there is provided a receiver comprising a demultiplexing module. The demultiplexing module comprises an input node coupled to receive a combined signal comprising a digital communication signal and one or more analog subcarrier signals. The demultiplexing module comprises a first output node to output the digital communication signal and a second output node to output the one or more analog subcarrier signals. The demultiplexing module is configured to separate the digital communication signal from the one or more analog subcarrier signals by detecting the one or more analog subcarrier signals within one or more low amplitude windows of the digital communication signal.

According to another aspect there is provided a method in a receiver node of a telecommunication network. The method comprises receiving a combined signal comprising a digital communication signal and one or more analog subcarrier signals, and separating the digital communication signal from the one or more analog subcarrier signals by detecting the one or more analog subcarrier signals within one or more low amplitude windows of the digital communication signal.

BRIEF DESCRIPTION OF THE DRAWINGS

For a better understanding of examples described herein, and to show more clearly how the examples may be carried into effect, reference will now be made, by way of example only, to the following drawings in which.

DETAILED DESCRIPTION

Figure 1A:
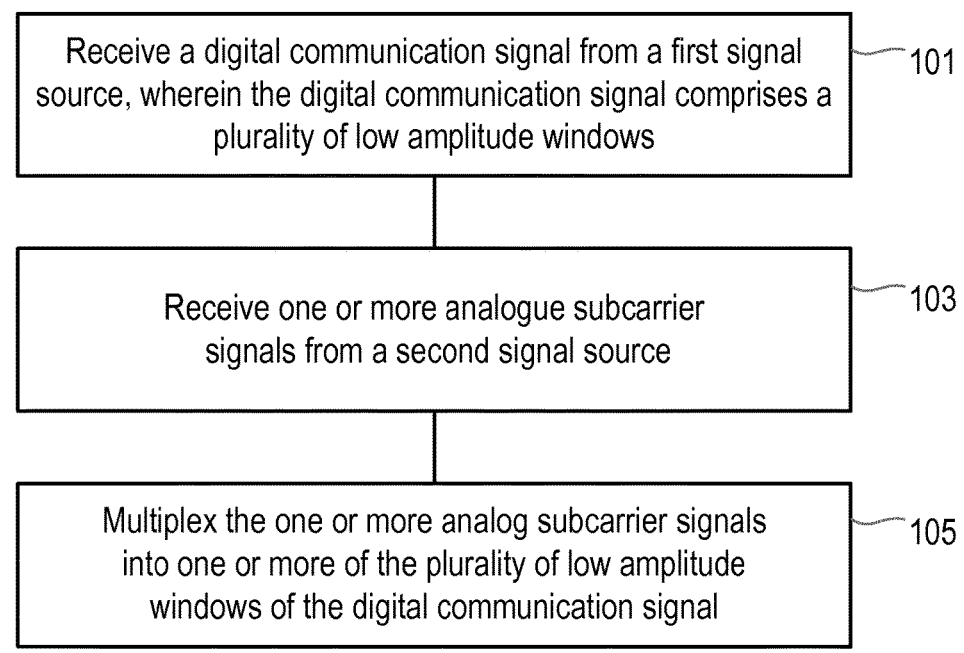
FIG. 1a shows an example of a method according to an embodiment.

In the examples described herein reference will be made to multiplexing and/or demultiplexing analog and digital signals in telecommunication networks, for example analog signals relating to 3$^{rd}$ Generation Partnership Project (3GPP) networks such as High Speed Packet Access (HSPA) networks or Long Term Evolution (LTE) networks or 5G networks, and digital signals relating to local communication networks, such as Wi-Fi networks. It is noted, however, that the embodiments are not limited to these specific examples, and that digital and analog signals from other communication systems, or other environments, may also be multiplexed and/or demultiplexed in the manner described in the examples.

As mentioned in the background section, in some examples of combined 3GPP and Wi-Fi traffic, a common Ethernet link can be used to backhaul both 3GPP and Wi-Fi traffic from an aggregation node at a small-cell site. The use of such a common Ethernet link requires 3GPP and Wi-Fi processing at the small-cell site, for example baseband processing of 3GPP signals which can present drawbacks.

3GPP and Wi-Fi traffic have some important differences. For example, Wi-Fi is based on an unregulated access to the radio resources, with comparatively poor handling of the mobility and concurrent connections of users. On the other hand, 3GPP radio access technologies such as HSPA or LTE offer regulated access to the radio resources and are much more efficient in managing interferences, high number of users (concurrent access) and their mobility.

Most of the features offered by HSPA or LTE require coordination between small-cells, and this can be difficult to achieve if 3GPP baseband processing is carried out at the small-cell site.

Centralization of baseband processing for a group of radio base stations, regardless of whether the radio base stations relate to macro-cells, small-cells or a combination of them, remains a desired option to increase HSPA/LTE performance and radio access network capacity.

Radio over fiber (RoF) is a technology able to transport radio signals over fiber, so that they are ready to be transmitted over the air (analog RoF) or digital-to-analog converted and associated to a proper radio carrier (digital RoF or Common Public Radio Interface, CPRI). Although centralized baseband processing is possible over RoF, unfortunately it has drawbacks. One such drawback is that it is not cost effective, because it requires higher bandwidth and/or highly linear optical/electrical converters to guarantee good dynamic and low distortions. Another drawback is that it is not suitable to transport Wi-Fi radio channels to a centralized processing site, because this is not competitive in terms of cost (for example because Wi-Fi access does not receive much benefit from a centralized baseband processing, and because Wi-Fi chipsets are available at extremely low cost).

Current small-cells solutions are based on a local baseband processing, eventually providing also Wi-Fi access, or are based on a centralized processing of 3GPP data, for example using a system known as a Radio DOT System by the present Applicant.

The Radio DOT System allows the provision of a capillary 3GPP indoor coverage by distributing analog signals over copper at an intermediate frequency. Fiber backhaul small-cells solutions are under investigation to increase the distance of antenna elements from the first aggregation point (e.g. site routers or digital units). Unfortunately, using radio dots for Wi-Fi is not cost effective due to the cost of conversion at intermediate frequency, and due to dynamic power range problems.

The embodiments described below provide a hybrid analog and digital multiplexing solution whereby analog radio signals (for example narrowband 3GPP radio signals) are multiplexed with a digital signal (for example a high data rate digital Wi-Fi signal) for transmission over a transmission medium, for example an optical fiber.

As will be described in greater detail below, the embodiments described herein have the advantage of enabling 3GPP signals to be transported in their usual format up to a centralized baseband processing site (for example as one or more narrowband analog subcarrier signals, hence not requiring baseband processing at the small-cell site), while other network traffic, such as Wi-Fi traffic, can be terminated at the small-cell site and backhauled in a digital manner, for example over a high data rate Ethernet connection.

FIG. 1a shows a method in a node of a telecommunication network according to a first embodiment. The method comprises receiving a digital communication signal from a first signal source, wherein the digital communication signal comprises a plurality of low amplitude windows, step 101. The method comprises receiving one or more analog subcarrier signals from a second signal source, step 103. The one or more analog subcarrier signals are multiplexed into one or more of the plurality of low amplitude windows of the digital communication signal, step 105.

This has the advantage of allowing a digital communication signal, for example a Wi-Fi communication signal which has been converted into a high speed digital signal, such as a GbE digital signal for digital backhaul, to be combined with one or more analog subcarrier signals, for example analog subcarrier signals relating to analog radio signals of a 3GPP telecommunication network, for example HSPA or LTE networks.

In one example, the method comprises multiplexing a plurality of analog subcarrier signals into each of one or more low amplitude windows (or notches) of the digital communication signal. In some examples different numbers of analog signals can be multiplexed into different low amplitude windows, for example one analog subcarrier signal into one notch, two analog subcarrier signals into another notch, and so on in any combination, and any number (depending for example on the width of the narrowband analog signals, and the width of the low amplitudes windows).

Analog 3GPP subcarrier signals have a quite compact spectrum compared with GbE (for example 40 MHz signals being sufficient for 2×2 MIMO 20 MHz LTE signals), and as such it is possible to accommodate one or even more radio signals in each notch (low amplitude window). The number of analog signals interposed in each low amplitude window can depend, for example, on the required end to end performance.

According to one embodiment, the manner in which one or more analog subcarrier signals are multiplexed into the one or more low amplitude windows (notches) of the digital communication signal can be determined, for example, according to one or more of the following criteria:

the central frequency and bandwidth of a low amplitude window (which may in turn be determined according to end to end performance);

the bandwidth of each analog subcarrier signal;

the total number of analog subcarrier signals;

the required dynamic range and/or noise tolerance of each analog subcarrier signal (which can determine the useable notch bandwidth);

the minimum signal to noise ratio tolerated by a digital receiver coupled to receive the multiplexed signal.

In some embodiments the plurality of low amplitude windows of the digital communication signal are periodic. In such an embodiment, the method may comprise selecting an intermediate frequency used to up convert the analog subcarrier signals such that the intermediate frequency matches the periodicity of the low amplitude windows of the digital communication signal.

This provides signals that are weakly superimposed in frequency, which has an advantage of enabling mutual interferences to be reduced.

In the example the one or more analog subcarrier signals may comprise telecommunication radio signals, such as 3GPP communication signals, for example HSPA or LTE or other such telecommunication networks, while the digital communication signals may comprise, for example, local network communication signals, such as a GigaBit Ethernet, GbE, signal used to transport Wi-Fi communication signals. It is noted that Wi-Fi is only an example, and that the digital communication signal may comprise any type of traffic that it is terminated at the radio cell (e.g. small-cell or DOT) and backhauled by a high speed digital signal which presents periodic low amplitude windows. For example, also a 3GPP signal (e.g. LTE or LTE Advanced) terminated at the small-cell site and backhauled with GbE can be processed in the same way as Wi-Fi. In such an example case, it is possible to have 3GPP signals terminated at a small-cell site and backhauled with GbE while other 3GPP signals that need centralized baseband processing are analog multiplexed with the GbE signal.

Figure 1B:
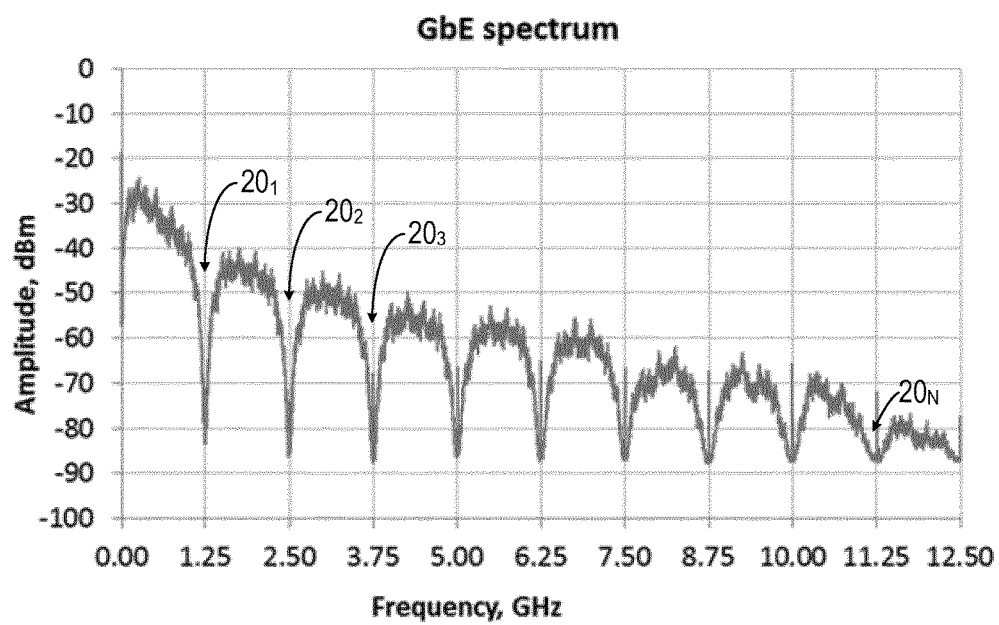
FIG. 1b illustrates an example of an amplitude versus frequency spectrum for a digital signal.

FIG. 1b shows an example of a digital signal, and in particular an example of the amplitude versus frequency spectrum of a GigaBit Ethernet (GbE) signal. In this example the GbE signal has a data rate of 1.25 Gbps, and as such the spectrum of the GbE signal comprises periodic notches, at 1.25 GHz, 2.5 GHz, and so on. These notches are the low amplitude windows $20_1$, $20_2$, $20_3$, and $20_n$ in which the narrowband analog subcarrier signal(s) are accommodated according to the embodiments described herein. By multiplexing analog subcarrier signals, such as 3GPP signals (HSPA/LTE) in GbE notches, the crosstalk of Ethernet over analog 3GPP signal (and vice versa) is lower.

As mentioned above, according to one embodiment, an Intermediate Frequency (IF) used to up convert the analog 3GPP subcarrier signals is selected to match the notches (low amplitude windows) in the spectrum of the digital signal, in order to have signals that are weakly superimposed in frequency. In other words, the one or more analog subcarrier signals can be up converted at a specific intermediate frequency, which matches the notches in the digital spectrum. This has the advantage of enabling mutual interferences to be reduced. In this way analog components are seen as additional noise sources by the digital signal and vice versa.

Figure 2:
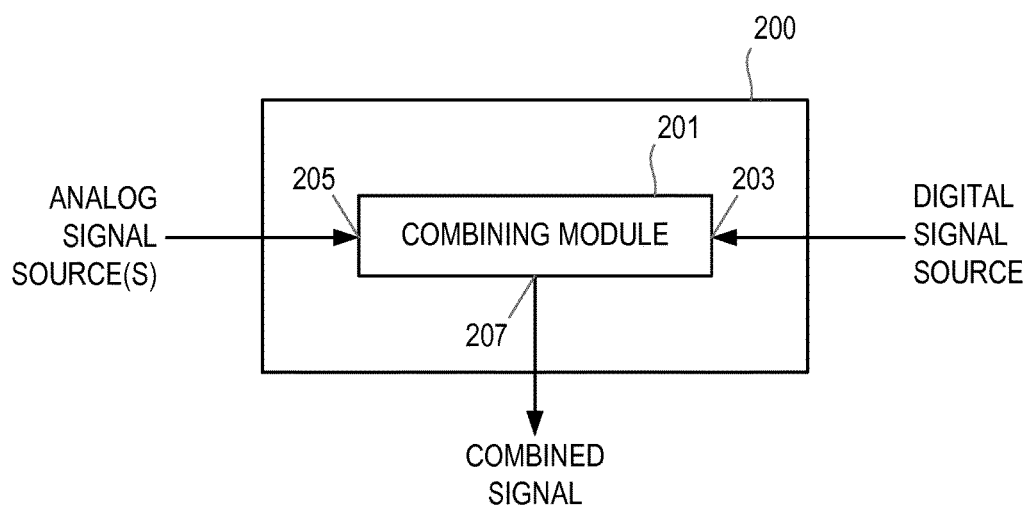
FIG. 2 shows an example of a multiplexing apparatus according to an embodiment.

FIG. 2 shows an example of a multiplexing apparatus 200 according to an embodiment. The multiplexer apparatus 200 comprises a combining module 201.

The combining module 201 comprises a first input node 203 coupled to receive a digital communication signal from a first signal source (for example a first signal source providing Wi-Fi traffic signals), wherein the digital communication signal comprises a plurality of low amplitude windows. The combining module 201 further comprises a second input node 205 coupled to receive one or more analog subcarrier signals from a second signal source (for example a second signal source providing 3GPP radio signals).

The combining module 201 is configured to multiplex the one or more analog subcarrier signals into one or more of the plurality of low amplitude windows of the digital communication signal. The combining module 201 further comprises an output node 207 to output the multiplexed signal.

Next there will be described further examples of how the digital and analog signals may be combined. The embodiments described below are based on electrically multiplexing and optically multiplexing the analog (3GPP) and digital (GbE) signals, as described respectively in FIGS. 3 to 6 (for electrically multiplexing) and FIGS. 7 to 10 (for optically multiplexing). As will be seen, in both embodiments the use of a common receiver is possible, also in the case of GbE and 3GPP signals transmitted over fiber by using dedicated wavelengths. It is noted that these embodiments are merely examples, and that other arrangements may also be used to multiplex the analog and digital signals, and that other transmission mediums may also be used.

Figure 3:
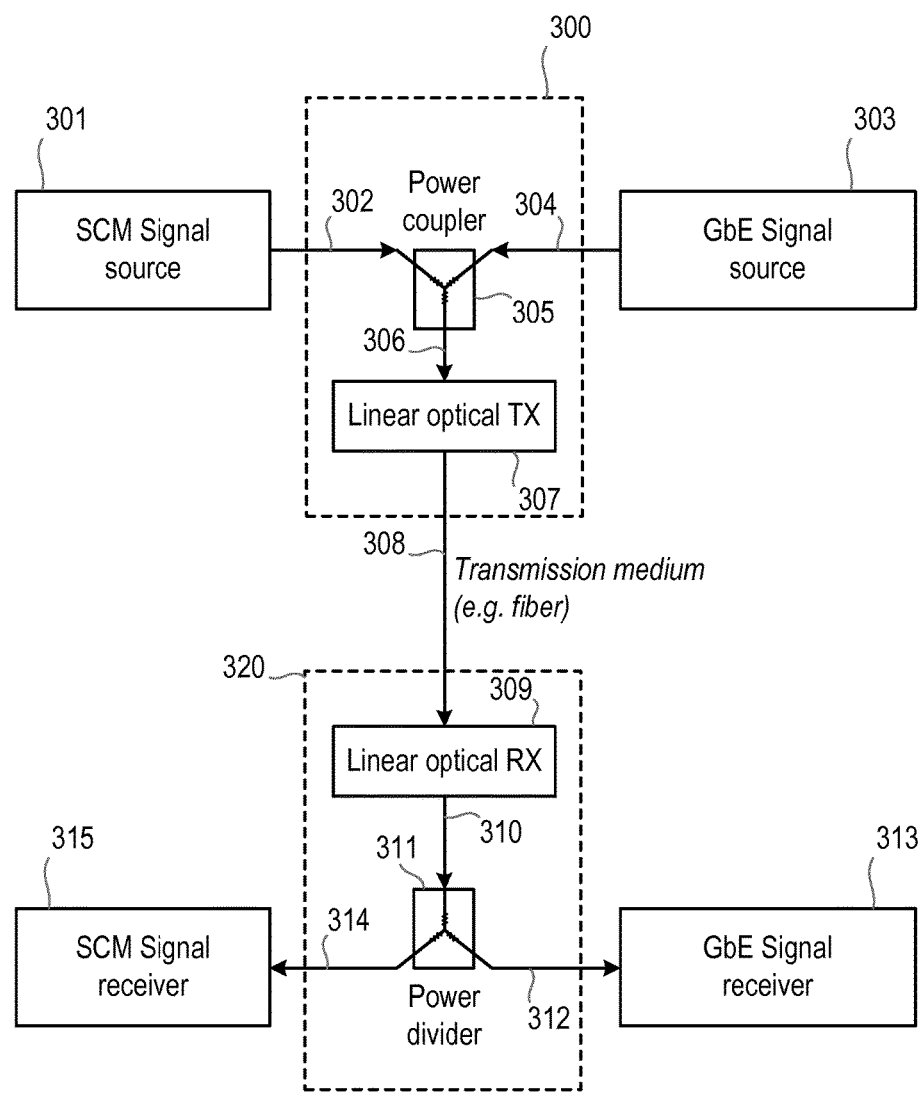
FIG. 3 shows an example of an application of a multiplexing apparatus according to an embodiment.

According to one embodiment shown in FIG. 3, the hybrid multiplexing of a digital signal and analog signal(s) is realized in the electrical domain, after which the composite signal is used to modulate an optical carrier.

A node 300 at the point of aggregation, for example at a small-cell node, receives an electrical analog signal 302 provided, for example, by a sub-carrier multiplexing (SCM) signal source 301. The node 300 also receives an electrical digital signal 304 provided, for example, by a GbE signal source 303.

The SCM signal source 301 presents narrow band subcarriers (e.g. Mhz 40 MHz) which, as mentioned earlier, may be spaced apart to match the low amplitude windows (notches) in the digital signal, for example spaced apart by 1.25 GHz in the example of FIG. 1b. In one example, only one subcarrier is used. It is noted that although the SCM signal source 301 is shown as being separate to the node 300, the SCM signal source may form part of the node 300. Likewise, although the GbE signal source is shown as being separate to the node 300, the GbE signal source may form part of the node 300.

The node 300 comprises a combining unit 305 for multiplexing the electrical analog signal(s) 302 with the electrical digital signal 304, for example using a power coupler. It is noted that other apparatus and methods may also be used to combine the analog and digital signals electrically. A common linear photo-transceiver 307 receives the combined electrical analog and digital signal 306, and converts this combined signal into a combined analog and digital optical signal, for transmission to a receiver over a transmission medium 308, for example over an optical fiber.

Thus, according to this embodiment, there is provided a multiplexing apparatus (for example the node 300) comprising a combining module, wherein the combining module comprises an electrical combining module 305 for combining an electrical digital communication signal 304 with one or more electrical analog subcarrier signals 302.

In this example the multiplexing apparatus (or node 300) further comprises an optical transmitter, for example a linear optical transmitter 307, for converting the combined one or more analog subcarrier signals 302 and digital communication signal 304 into a combined optical signal for transmission over an optical transmission medium 308.

At the receiver side, a receiver 320 comprises an optical frontend, for example a linear optical receiver 309 (photoreceiver). After photo detection and conversion to a combined electrical analog and digital signal 310, the combined electrical signal is coupled to a demultiplexing module, for example a power divider 311 comprising two different electrical receivers: a first one dedicated to the detection of the one or more analog subcarrier signals (SCM signals), and a second one for detecting the digital communication signal (for example the digital GbE signal). The demultiplexing module 311 comprises a first output node 312 to output the digital communication signal, for example to a digital receiver, such as a GbE signal receiver 313, and a second output node 314 to output the one or more analog subcarrier signals to an analog signal receiver, for example a SCM signal receiver 315.

One advantage of the arrangement shown in the embodiment of FIG. 3 is the use of a single optical transmitter 307 for the hybrid signal.

Figure 4:
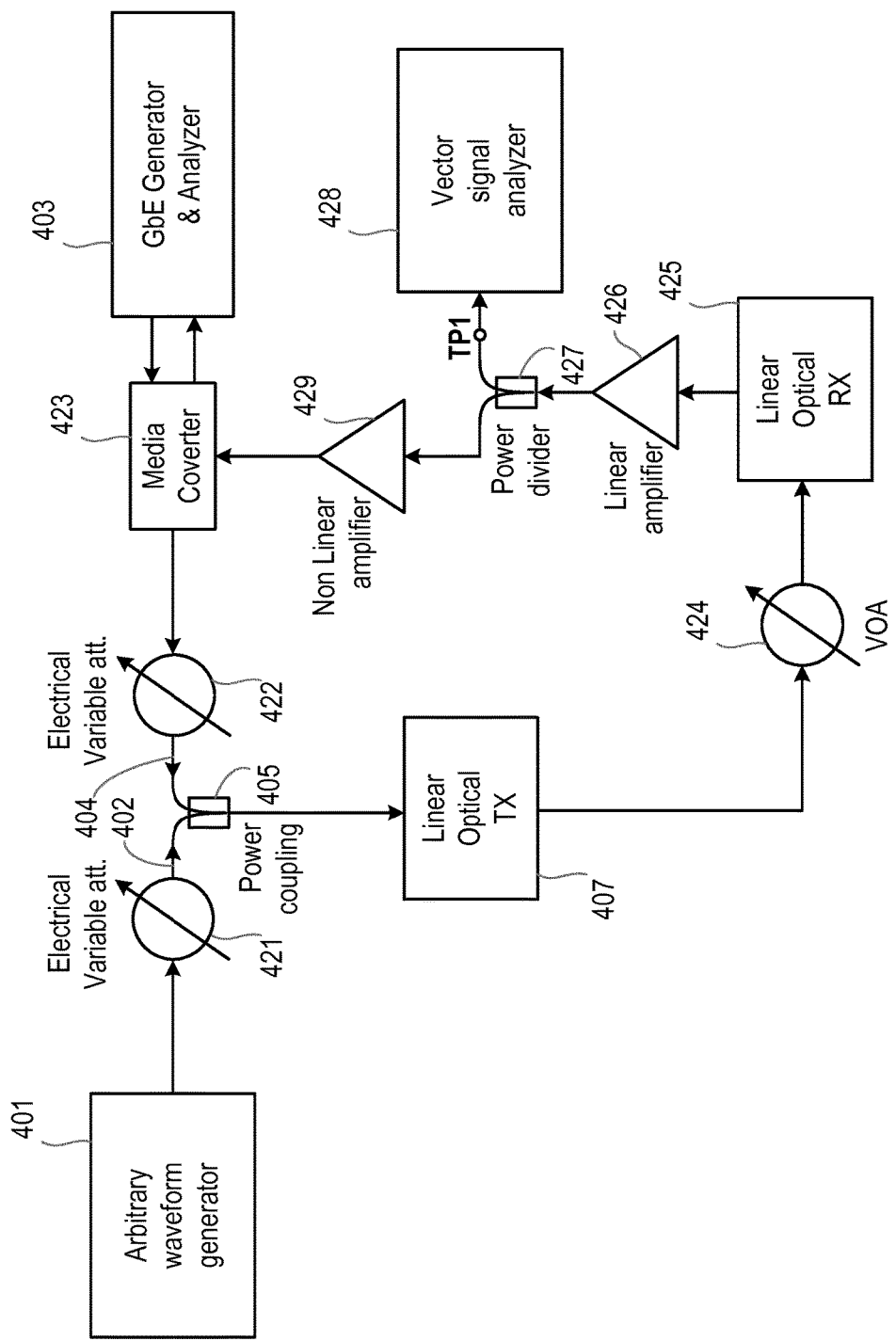
FIG. 4 shows an example of a test arrangement for the example of FIG. 3.

FIG. 4 shows as an example a laboratory test arrangement for testing the embodiment of FIG. 3. The example multiplexing one 64QAM signal with 40 Mbaud at the center of the GbE first notch. The lab setup and the hybrid multiplexed signal after optical transmission and detection with a linear optical receiver with 3 GHz of bandwidth are shown in FIG. 4.

In this example of a test arrangement, a power coupling 405 combines a 64QAM 40 Mbaud signal 402 provided by an arbitrary waveform generator 401 with a digital communication signal 404, GbE, provided by a GbE generator and analyzer 403. The electrical variable attenuators 421 and 422 are used to test system performance with different values of electrical power. Module 407 is a linear optical transmitter (for the analog signal). Optical power at the receiver side is controlled by a variable optical amplifier (VOA) 424. After photo detection by an optical receiver 425 the combined signal is linearly and electrically amplified by a linear amplifier 426, and then demultiplexed by the power divider 427 and conveyed to a vector signal analyzer 428 (e.g. a 3GPP receiver) and to a non-linear amplifier 429 for power conversion, media converter 423 for media conversion and the GbE Generator/Analyzer 403 for GbE reception. It is noted that FIG. 4 represents an example of a lab arrangement, and as such not all the blocks are necessary (e.g. media converter 423 has been inserted for converting the optical input/output of GbE generator/analyzer 403 in the electrical domain because it provides optical input/output).

Figure 5:
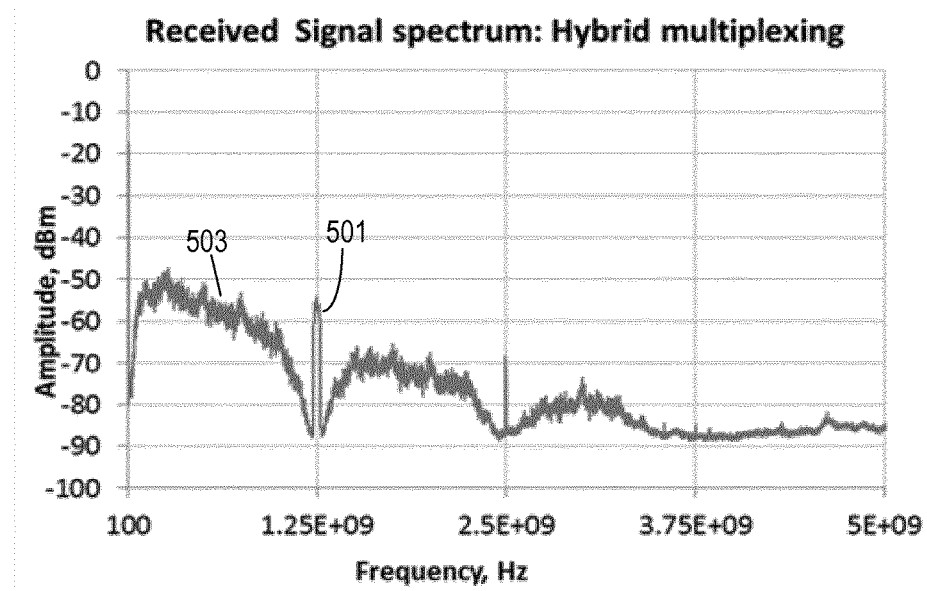
FIG. 5 shows an example of an amplitude versus frequency spectrum showing the results of the test arrangement of FIG. 4.

Referring to FIG. 5, this shows the spectrum of the hybrid multiplexed signal, which includes a digital communication signal (GbE digital signal) combined with just one analog subcarrier signal in this example (i.e. one 64QAM analog signal at 40 MHz). It corresponds to the point labelled TP1 in FIG. 4, and has been photo detected by a receiver with a 3 GHz bandwidth. FIG. 5 shows the analog signal 501 multiplexed in the first notch of the digital communication signal 503.

Figure 6:
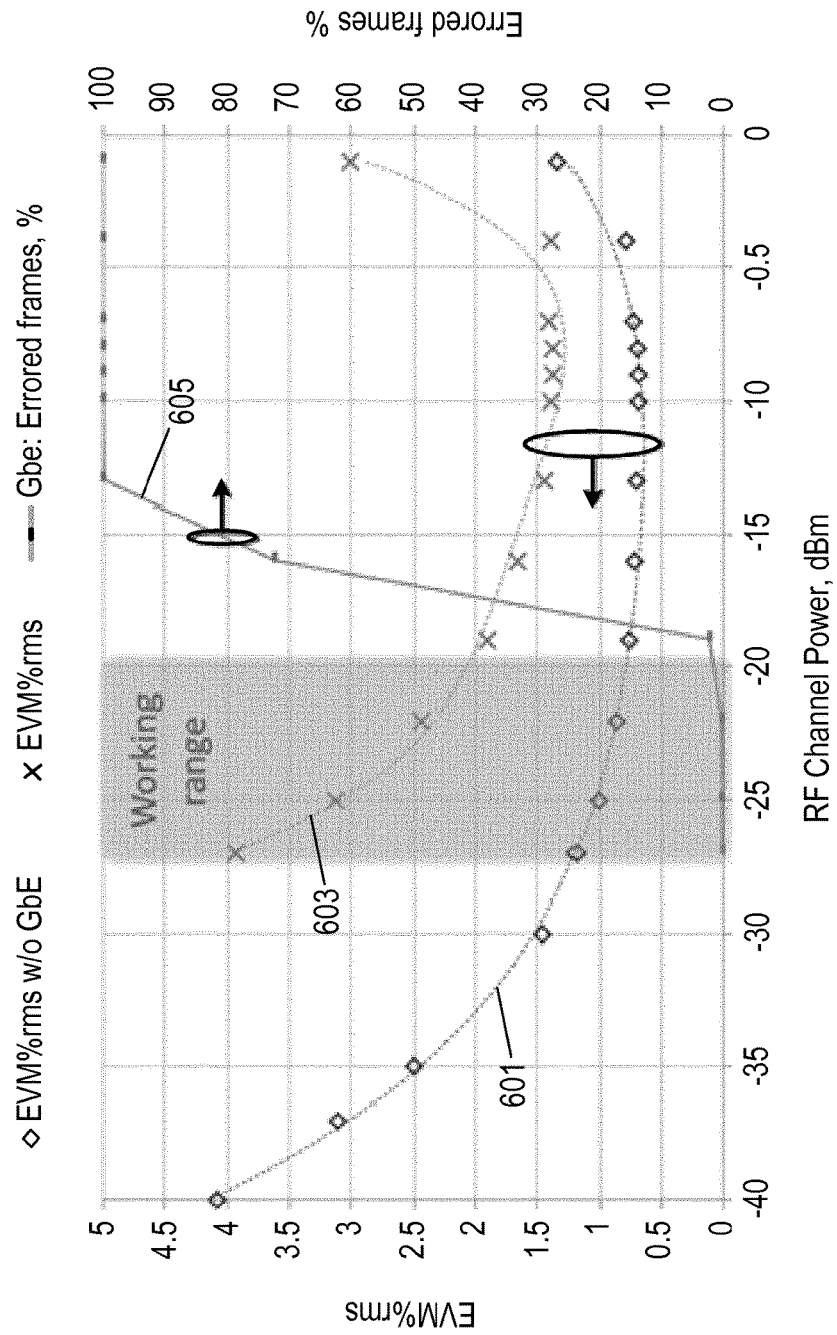
FIG. 6 shows an example of overall performance of the example shown in FIG. 3.

Changing the power of the 3GPP signal can impact the overall performance of both digital and the analog receivers. Referring to FIG. 6 there is a region corresponding to a RF channel in a range between −27 dBm to −20 dBm (shown as the shaded working region), where end to end Error-Vector Magnitude (EVM, labelled 601/603) of the 64QAM signal is more than acceptable (i.e. whereby it always stays below 4% rms) and the GbE receiver works without errors (as shown by the error curve 605).

Of the curves shown in FIG. 6, two of them show the measured EVM % rms of 64QAM signal with and without impairments inducted by GbE signal, i.e. curves 603 and 601, respectively, with the other curve 605 showing the performance of GbE as a function of the 64QAM RF power.

Figure 7:
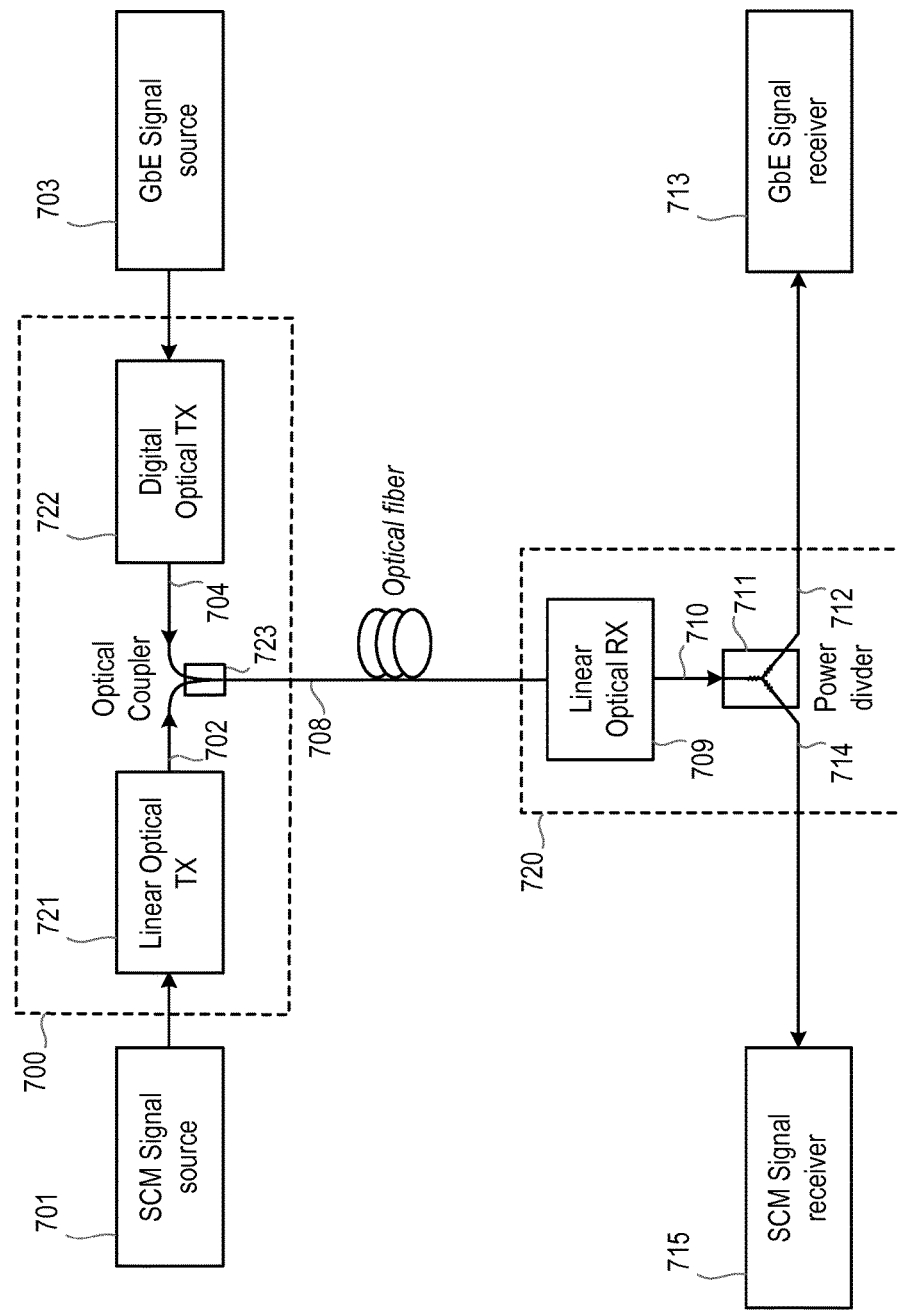
FIG. 7 shows an example of another application of a multiplexing apparatus according to an embodiment.

FIG. 7 shows an embodiment in which the hybrid multiplexing of a digital signal and analog signal(s) is realized in the optical domain, after which the composite signal is used to modulate an optical carrier.

A node 700 at the point of aggregation, for example at a small-cell node, comprises a linear optical transmitter 721 which receives electrical analog subcarrier signals from an analog signal source 701, and converts the electrical analog signals into optical analog subcarrier signals 702. A digital optical transmitter 722 receives electrical digital communication signals from a digital signal source 703, and converts the electrical digital communication signals into optical digital communication signals 704.

The SCM signal source 701 presents narrow band subcarriers (e.g. 40 MHz) which, as mentioned earlier, may be spaced apart to match the low amplitude windows (notches) in the digital signal, for example spaced apart by 1.25 GHz in the example of FIG. 1b. In one example, only one subcarrier is used. It is noted that although the SCM signal source 701 is shown as being separate to the node 700, the SCM signal source may form part of the node 700. Likewise, although the GbE signal source 703 is shown as being separate to the node 700, the GbE signal source 703 may form part of the node 700.

The node 700 comprises a combining unit 723 for multiplexing the optical analog signal(s) 702 with the optical digital signal 704, for example using an optical coupler. It is noted that other apparatus and methods may also be used to combine the analog and digital signals optically. The combined optical analog and digital signal is transmitted over a transmission medium 708, for example over an optical fiber.

Thus, the arrangement of FIG. 7 is based on optical multiplexing the two tributary signals. This embodiment comprises two different optical transmitters, one for the analog signal and the second one for the digital signal. The optical transmitters may include a laser source. No laser cooling or wavelength stabilization are needed, enabling the use of low cost optical transmitters. In one embodiment the two optical carriers are selected with different nominal wavelengths to avoid in band beating noise at the receiver side.

Thus, in the embodiment of FIG. 7, a multiplexing apparatus (node 700) comprises a combining module in the form of an optical combining module 723, for combining an optical digital communication signal 704 with one or more optical analog subcarrier signals 702. The optical combining module 723 may comprise an optical coupler.

The multiplexing apparatus may further comprise a linear optical transmitter 721 configured to convert one or more received electrical analog subcarrier signals into one or more analog optical subcarrier signals 702 received by the optical combining module 723, and a digital optical transmitter 722 configured to convert a received electrical digital communication signal into an optical digital communication signal 704 received by the optical combining module 723.

At the receiver side, a receiver 720 comprises an optical frontend, for example a linear optical receiver 709 (photoreceiver). After photo detection and conversion to a combined electrical analog and digital signal 710, the combined electrical signal is coupled to a demultiplexing module, for example a power divider 711 comprising two different electrical receivers: a first one dedicated to the detection of the one or more analog subcarrier signals (SCM signals), and a second one for detecting the digital communication signal (for example the digital GbE signal). The demultiplexing module 711 comprises a first output node 712 to output the digital communication signal, for example to a digital receiver, such as a GbE signal receiver 713, and a second output node 714 to output the one or more analog subcarrier signals to an analog signal receiver, for example a SCM signal receiver 715.

It is noted that in the embodiment of FIG. 7 (and that of FIG. 3 above), there are no dedicated electrical or optical filters used: the same hybrid multiplexed signal is sent to the digital (GbE) and analog (64QAM) receivers: the GbE receiver perceives the SCM signal as a tolerable noise and the SCM signal receiver filters out the GbE signal. This has an advantage that demultiplexing can be performed by a simple power divider.

An advantage of the embodiment shown in FIG. 7 is the possibility to design in a cost effective way the two different optical transmitters tailored for the two types of tributary signals, i.e. the optical transmitters 721 and 722 for the analog and digital tributary signals, respectively.

Figure 8:
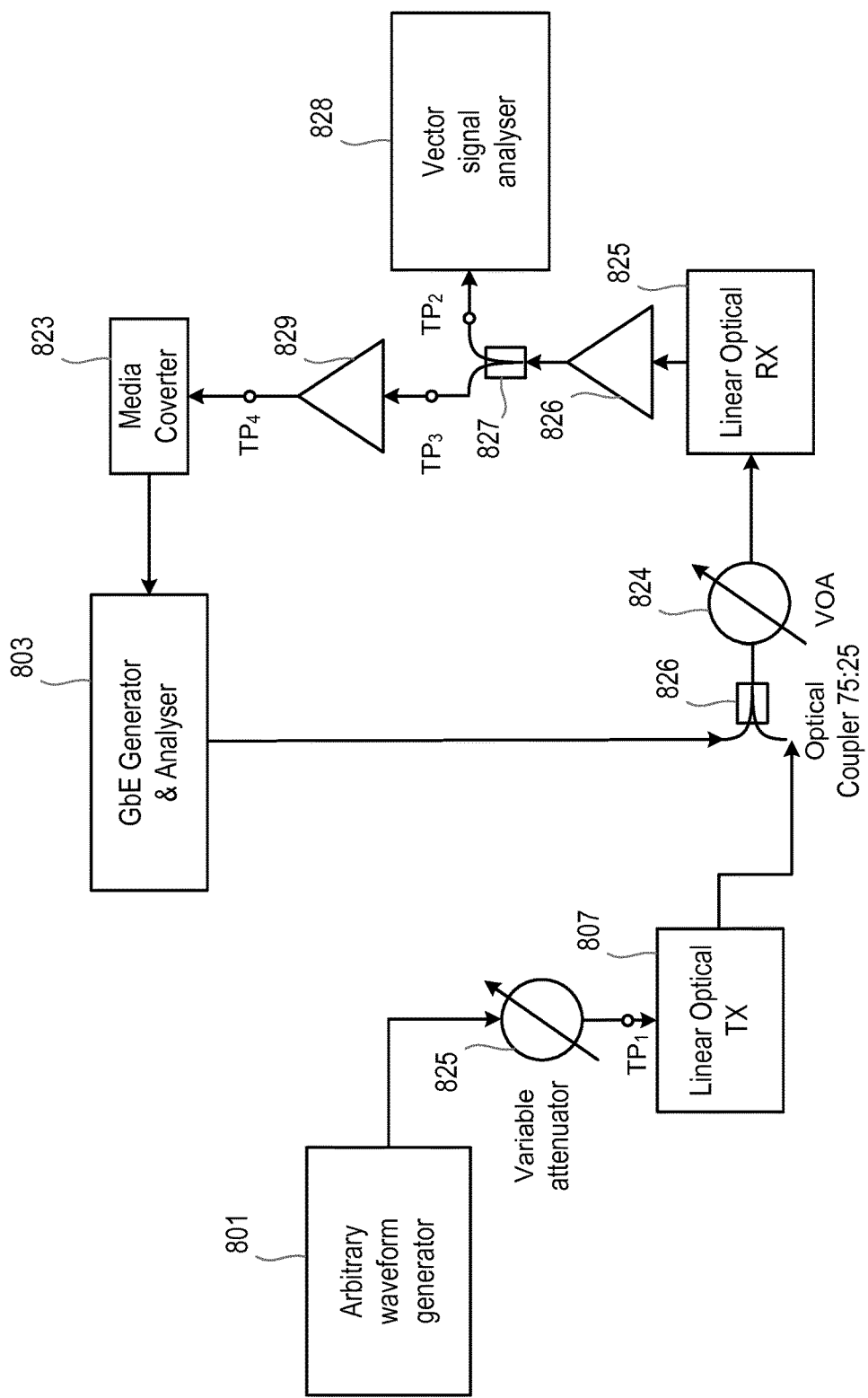
FIG. 8 shows an example of a test arrangement for the example of FIG. 7.

FIG. 8 shows as an example a laboratory test arrangement for testing the embodiment of FIG. 7. The example multiplexes one 64QAM signal with 40 Mbaud at the center of the GbE first notch. In the example of FIG. 8 the test arrangement comprises a power coupling 826 which combines the 64QAM 40 Mbaud signal provided by an arbitrary waveform generator 801 with a digital communication signal provided by a GbE Generator/Analyzer 803. An electrical variable attenuator 825 is used to test system performance with different values of electrical power. A linear optical transmitter 807 is dedicated to the analog signal. Optical power at the receiver side is controlled by a variable optical amplifier (VOA) 824. After photo-detection by a linear optical receiver 825 the combined signal is linear and electrically amplified by a linear amplifier 826, and then demultiplexed by a power divider 827 and conveyed to a vector signal analyzer 828 (e.g. a 3GPP receiver) and to a non-linear amplifier 829 for power adjustment, a media converter 823 for media conversion and the GbE Generator/Analyzer 803 for reception.

Figure 9:
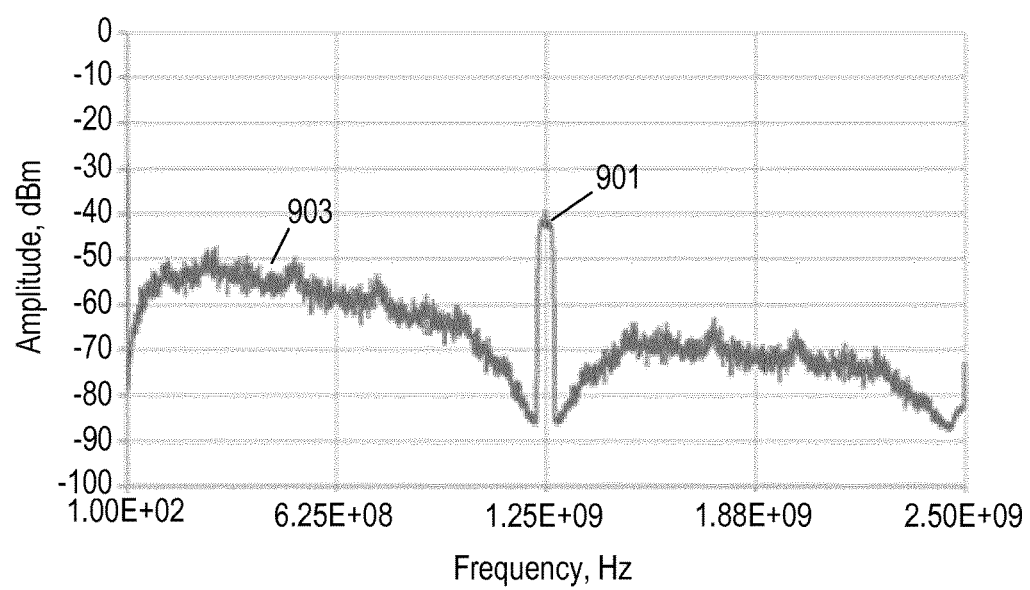
FIG. 9 shows an example of an amplitude versus frequency spectrum showing the results of the test arrangement of FIG. 8.

A portion of the hybrid multiplexed spectrum is shown in FIG. 9, where the multiplexed analog signal 901 is shown in a notch of the digital communication signal 903.

The optical coupling option increases the allowed dynamic range of the 3GPP component, so that they are now very close to that obtained without the GbE signal.

Figure 10:
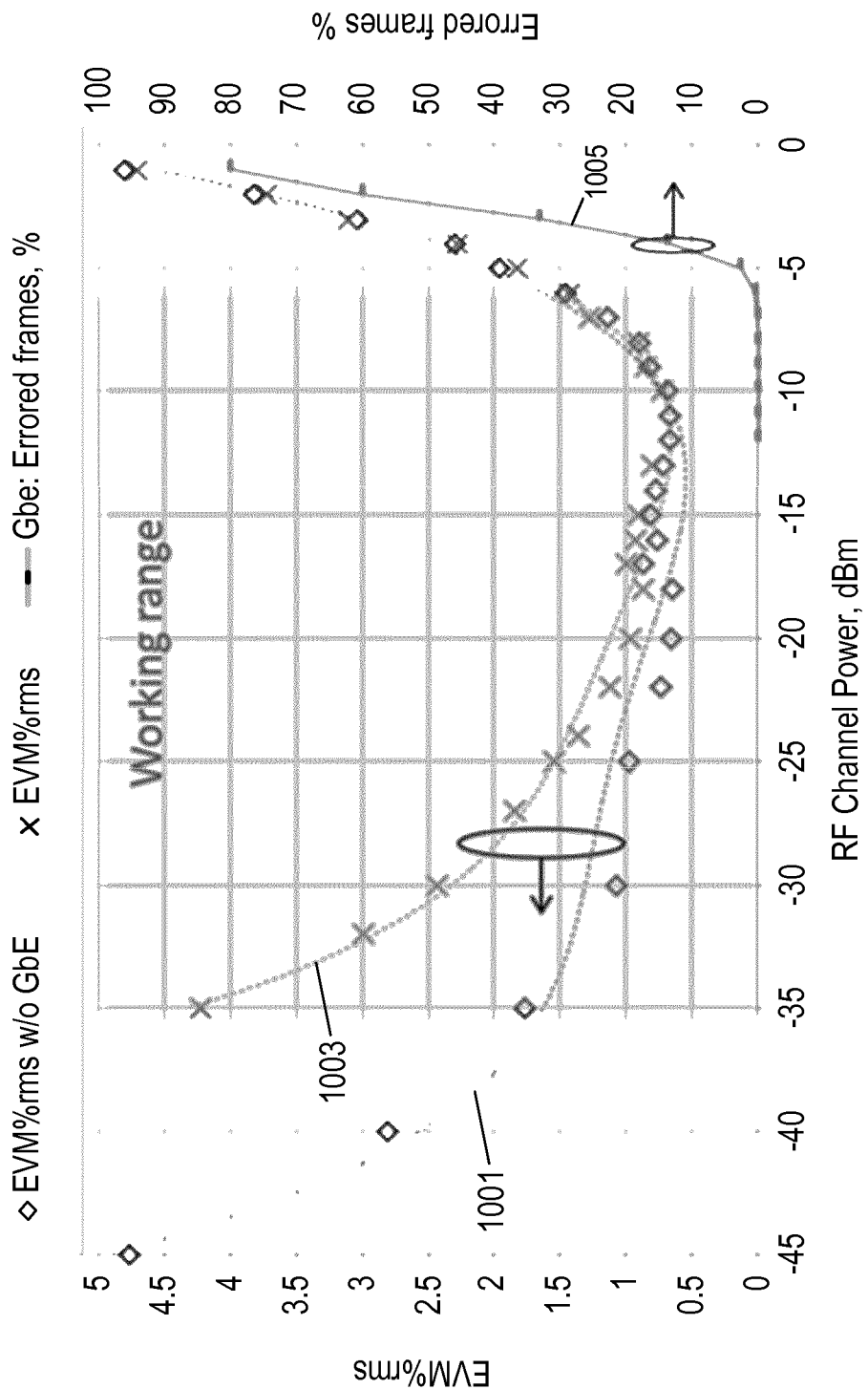
FIG. 10 shows an example of overall performance of the example shown in FIG. 7.

Referring to FIG. 10, there is a wide region corresponding to a RF channel in the range between −35 dBm up to −5 dBm (shown as the shaded working range), where Error-Vector Magnitude (EVM) of the 64QAM signal is more than acceptable (whereby in the example it always stays below 4% rms), and GbE receiver continues to work without errors.

In FIG. 10 the three different curves have been shown: two of them showing the measured EVM % rms of 64QAM signal with and without the GbE signal, labelled 1003 and 1001 respectively; the other curve showing the performance of the GbE receiver by increasing the 64QAM RF power, and labelled 1005.

It is noted that by tuning some optical and electrical parameters the hybrid multiplexing obtained by optical coupling can reduce the influence of the analog signal on the digital one, as it is shown in FIG. 10.

Figure 11:
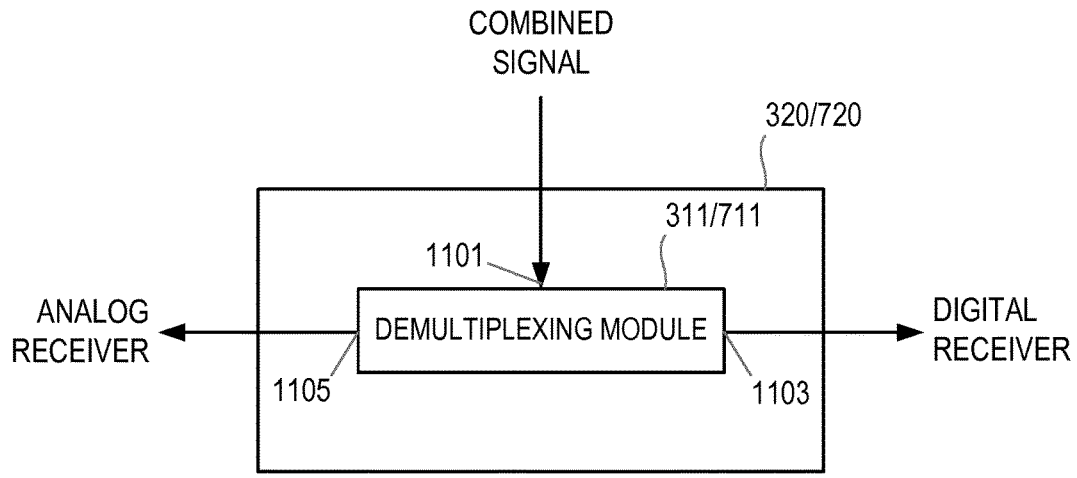
FIG. 11 shows an example of a receiver according to an embodiment.

FIG. 11 shows a receiver 320/720 according to another embodiment. The receiver 320/720 comprises a demultiplexing module 311/711 comprising an input node 1101 coupled to receive a combined signal comprising a digital communication signal and one or more analog subcarrier signals; a first output node 1103 to output the digital communication signal; and a second output node 1105 to output the one or more analog subcarrier signals. The demultiplexing module 311/711 is configured to separate the digital communication signal from the one or more analog subcarrier signals by detecting the one or more analog subcarrier signals within one or more low amplitude windows of the digital communication signal.

Figure 12:
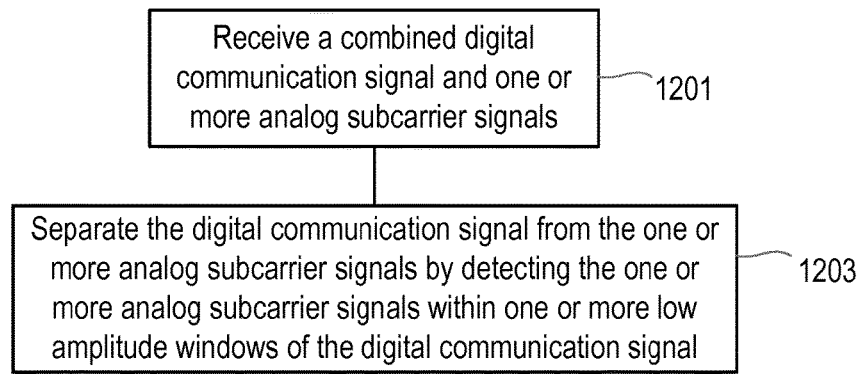
FIG. 12 shows a method in a receiver node according to another embodiment.

FIG. 12 shows a method in a receiver node of a telecommunication network, according to another embodiment. The method comprises receiving a combined signal comprising a digital communication signal and one or more analog subcarrier signals, step 1201. The method comprises separating the digital communication signal from the one or more analog subcarrier signals by detecting the one or more analog subcarrier signals within one or more low amplitude windows of the digital communication signal, step 1203.

The method may comprise, for example, passing the combined signal through a power divider to separate the digital and one or more analog signals.

Figure 13:
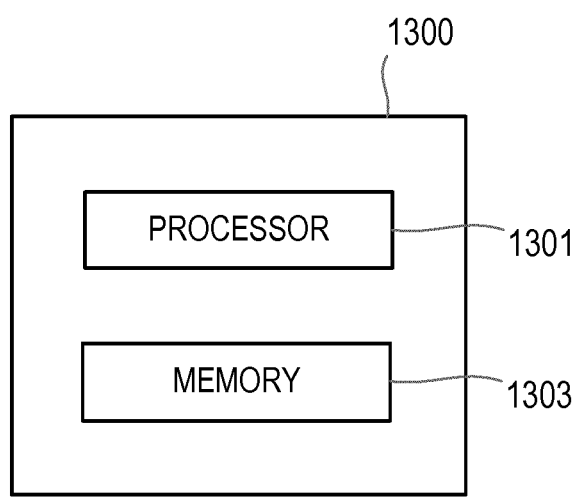
FIG. 13 shows an example of a node according to another embodiment.

FIG. 13 illustrates an alternative example of a multiplexer apparatus, which may implement the method of FIG. 1a or 12, for example on receipt of suitable instructions from a computer program. It will be appreciated that the units illustrated in FIG. 13 may be realised in any appropriate combination of hardware and/or software. For example, the units may comprise one or more processors and one or more memories containing instructions executable by the one or more processors. The units may be integrated to any degree.

Referring to FIG. 13, there is provided a network node 1300 comprising a processor 1301 and a memory 1303, the memory 1303 containing instructions executable by said processor 1301. In one example the network node 1300 is operative, in response to receiving a digital communication signal from a first signal source, the digital communication signal comprising a plurality of low amplitude windows, and in response to receiving one or more analog subcarrier signals from a second signal source, perform the steps of multiplexing the one or more analog subcarrier signals into one or more of the plurality of low amplitude windows of the digital communication signal.

The network node 1300, in another example, is operative to, in response to receiving a combined signal comprising a digital communication signal and one or more analog subcarrier signals, perform the steps of separating the digital communication signal from the one or more analog subcarrier signals by detecting the one or more analog subcarrier signals within one or more low amplitude windows of the digital communication signal. The processing unit 1301 may be configured to output the digital communication signal to a first output node, and output the one or more analog subcarrier signals to a second output node.

Figure 14:
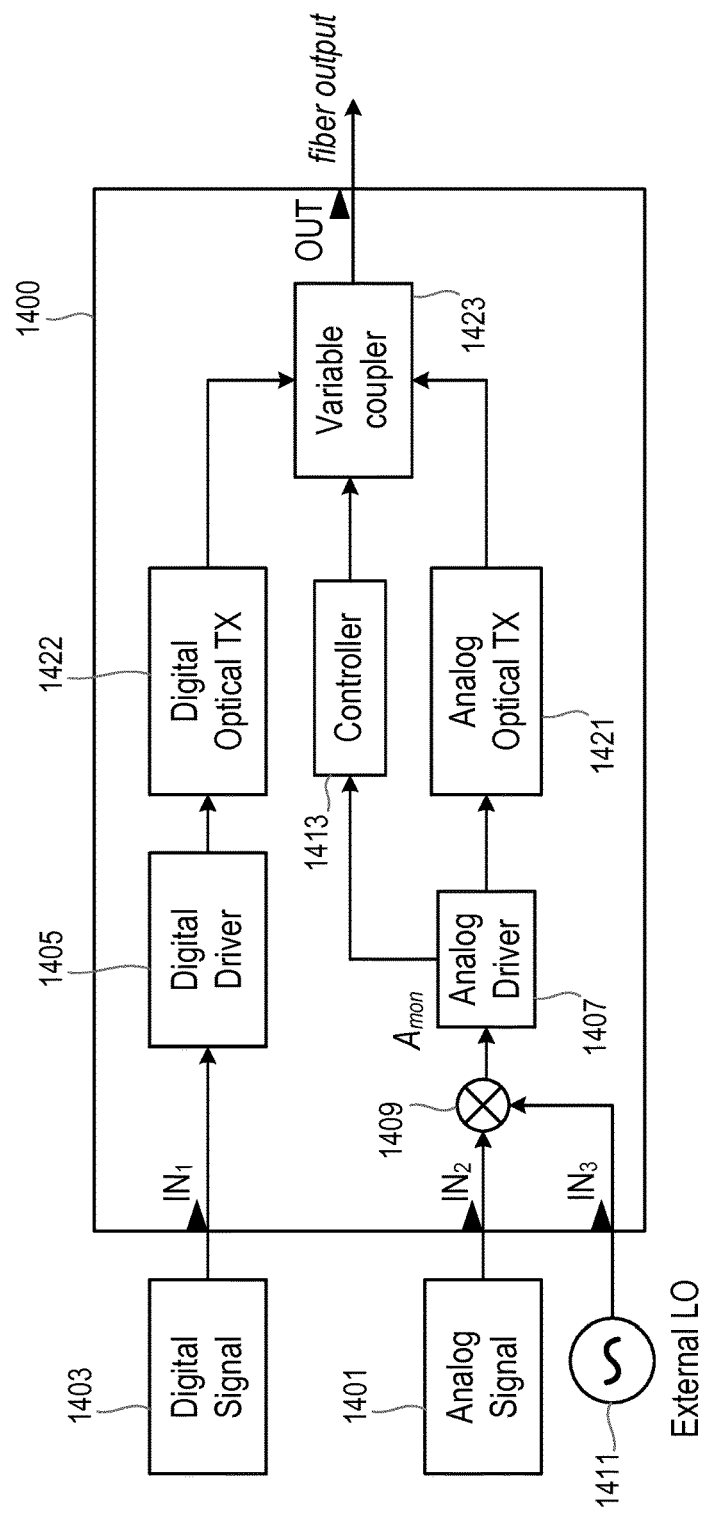
FIG. 14 shows an example of a multiplexing apparatus according to another embodiment.

FIG. 14 shows another embodiment in which the hybrid multiplexing of a digital signal and analog signal(s) is realized in the optical domain.

In the optical embodiment of FIGS. 7 to 10, the coupling ratio between analog and digital components sets the dynamic range, which may be chosen at a fixed value when the system is realized and deployed. However, the analog components used to accommodate 3GPP signals continuously change, and therefore the coupling ratio chosen at priori is not always the best one for any working condition.

As a consequence the dynamic range offered by the system of FIG. 7 can become reduced.

FIG. 14 discloses an embodiment which attempts to help improve any limitations arising from a fixed optical power ratio between the analog and digital components in the multiplexed signal. The embodiment of FIG. 14 utilizes an electro-optical transceiver that is able to continually adapt the power ratio of analog and a digital signals, before optical transport over fiber or, after a proper media conversion, over an alternative transmission medium (e.g. coax cable, microwave . . . etc.).

For example, the embodiment of FIG. 14 is able to increment the system dynamic range of the hybrid multiplexing realized in the optical domain by using a variable ratio optical coupler in combination with a method of setting and controlling the variable ratio optical coupler.

According to FIG. 14 the hybrid multiplexing apparatus 1400 comprises a digital optical transmitter 1422 for receiving a digital signal 1403. The hybrid multiplexing apparatus 1400 may comprise a digital driver module 1405 for driving the digital optical transmitter 1422.

The hybrid multiplexing apparatus further comprises an analog optical transmitter 1421, for receiving an analog signal 1401. The hybrid multiplexing apparatus 1400 may comprise an analog driver module 1407 for driving the analog optical transmitter 1421. Prior to being driven by the analog driver module 1407, the analog signal may be combined with an external local oscillator signal 1411 via a mixer 1409.

The hybrid multiplexing apparatus 1400 further comprises an optical combining module 1423 for combining the output of the optical digital transmitter 1422 and the output of the optical analog transmitter 1421. In this embodiment the optical combining module 1423 comprises an optical coupler, and in particular a variable ratio optical coupler. A controller 1413 is provided for controlling the variable ratio optical coupler 1423. It is noted that the controller 1413 may be a dedicated controller, or some other controller adapted to provide this function. In one example, the controller 1413 is adapted to control the variable ratio optical coupler 1423 based on a monitored analog signal, for example a monitored analog signal $A_{mon}$ derived from the analog signal, for example taken from the driver module 1407. According to one example, the ratio of the optical coupler is varied according to one or more parameters, for example according to changes in components within the analog circuit, or noise within the analog signal, or some other parameter relating to the signals being combined. In one example the controller 1413 may be adapted to control the variable ratio of the optical coupler 1423 based on comparing the analog signal with variable minimum and maximum values of the analog signal. In another example the controller 1413 is adapted to control the variable ratio of the optical coupler 1423 based on comparing the analog signal with fixed or predetermined threshold values for maximum and/or minimum values of the analog signal.

Usually the digital signal is very stable (i.e. because the amplitude of the electrical signal does not change in time) while the analog signal dynamically changes in a wide range.

According to another embodiment, there is provided a method for calculating the most appropriate coupling ratio of the variable optical coupler 1423, as will be described below in relation to FIG. 15.

At periodic intervals, for example each T0 seconds, the controller 1413 reads the analog monitoring signal $A_{mon}$ of the analog driver 1407 and compares this value with a maximum and minimum value of $\hat{A}_{mon}$ (the collection of the $A_{mon}$ values are read and stored in a memory system) and:

If $A_{mon}$ is equal to min($\hat{A}_{mon}$) the variable coupler is set in order to couple the maximum portion of the analog signal and the minimum portion of the digital signal to the output.

If $A_{mon}$ is greater than min($\hat{A}_{mon}$) and lower than MAX($\hat{A}_{mon}$) the optical coupling ratio of the arms is changed (for example according to Equations 2 and 3) to avoid intermodulation products with the digital signal at the receiver and to maximize the signal to noise ratio for the analog signal.

If $A_{mon}$ is equal to MAX($\hat{A}_{mon}$) the coupling ratio is set to 50% for both the arms of the device, i.e. 50% of the digital signal combined with 50% of the analog signal.

According to one example, this method can be synchronized with a radio scheduler. For example, for LTE the method could run at periodic intervals corresponding to each millisecond. As a consequence, an optimal power ratio is always reached for any change in the radio signal imposed by the radio scheduler. According to other examples, the method is run less frequently, for example after N changes to the radio signal.

Figure 15:
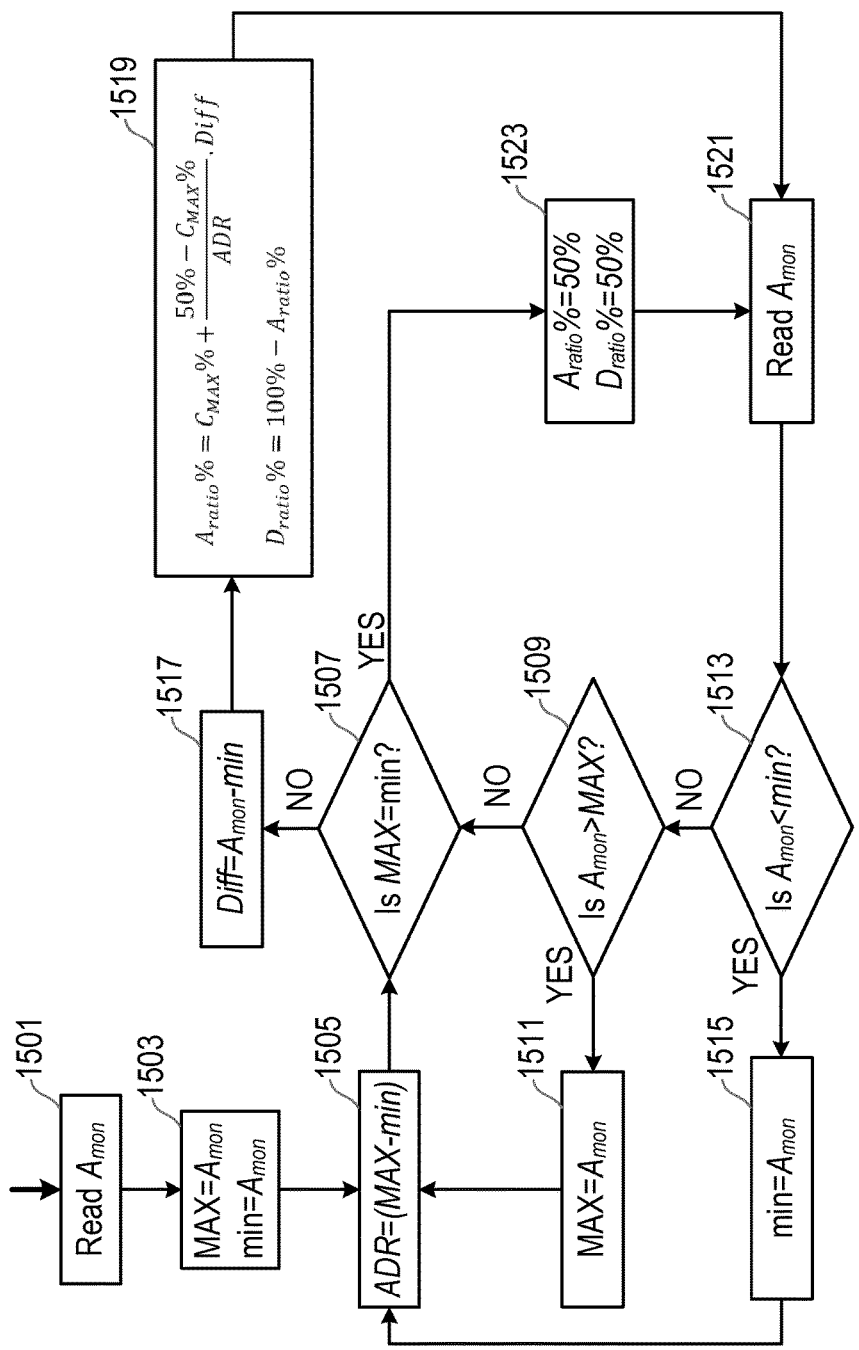
FIG. 15 shows an example of a method according to another embodiment.

Referring to FIG. 15, at periodic intervals, step 1501, for example at each T0 seconds, the controller reads the measure of the amplitude of the radio analog signal ($A_{mon}$) and updates the maximum and the minimum values stored in its system memory (at the first step occurring at the time T0, a common $A_{mon}$ value may be stored in the MAX and min memory cells, illustrated by step 1503). In one example $A_{mon}$ is an attenuated replica of the signal used to modulate the analog optical transmitter 1421.

In step 1505, maximum and minimum values of $A_{mon}$ are used to calculate the dynamic range (ADR) of the analog signal, for example as shown in Equation 1 below, that periodically changes (e.g. each T0 seconds):

$$ADR = MAX(A_{mon}) - min(A_{mon}) \qquad \text{Equation 1}$$

If the maximum value of $A_{mon}$ is not equal to the minimum value of $A_{mon}$, as determined in step 1507, the difference (Diff) between the current value of $A_{mon}$ and the one stored as minimum value (min($A_{mon}$)), shown at block 1517, is used to calculate the coupling ratio of an arm of the variable coupler, for example using the following equations in step 1519:

Analog Arm Coupling Ratio:

$$A_{ratio}\% = C_{MAX}\% + \frac{50\% - C_{MAX}\%}{ADR} \cdot Diff \qquad \text{Equation 2}$$

Digital Arm Coupling Ratio:

$$D_{ratio}\% = 100\% - A_{ratio}\% \qquad \text{Equation 3}$$

Where $C_{MAX}\%$ is the maximum coupling ratio for the arm of the power coupler connected with the radio analog signal.

From Equation 2 and Equation 3 it is possible to deduce that:

1. if $A_{mon}$=min($A_{mon}$) the variable coupler is set in order to couple the maximum portion of the analog signal ($A_{ratio}\% = C_{MAX}\%$) and the minimum portion of the digital signal ($D_{ratio}\% = 100\% - C_{MAX}\%$) to the output.

2. if $A_{mon}$=MAX($A_{mon}$) the variable coupler is set in order to couple the same portion of the analog and digital signal ($A_{ratio}\% = D_{ratio}\% = 50\%$) to the output, as shown in steps 1507, 1523, and 1521.

As mentioned above, if $A_{mon}$ is greater than min ($\hat{A}_{mon}$) and lower than MAX($\hat{A}_{mon}$) the optical coupling ratio of the arms is changed (according to Equations 2 and 3), as per step 1519, to avoid intermodulation products with the digital signal at the receiver and to maximize the signal to noise ratio for the analog signal.

Steps 1513 and 1515 show how the minimum value of $A_{mon}$ can be set during each cycle of the method. Steps 1509 and 1511 show how the maximum value of $A_{mon}$ can be set during each cycle of the method.

From the above it can be seen that the embodiment according to the method of FIG. 15 is able to adapt the coupling ratio of the two signals in order to extend the dynamic range of the entire system based on the monitoring of the analog radio frequency components. The adaptation of the power ratio is sufficiently fast (for example μ seconds) to follow a radio scheduler, and ensure the optimal power ratio between analog and digital signals. The power ratio may be adjusted by adjusting the ratio of the variable optical coupler of FIG. 14.

The embodiments of FIGS. 14 and 15 can help mitigate the noise in analog signals, by increasing the signal to noise ratio, for example when an analog signal is weak. They can also help avoid intermodulation products with the digital signal, for example arising when the analog signal is too strong. The embodiments of FIGS. 14 and 15 may also be realized with integrated photonics technologies, to dramatically reduce the cost, and can be used to increase the dynamic range of the radio analog signals. Tight cooperation with a radio scheduler can help provide a robust and practical tuning of the optical coupling ratio in response to any change that occurs at the radio layer, such as radio modulation changes occurring at each TTI (Time Transmission Interval). In one embodiment, all the information used by the method of FIG. 15 is available at the transmitter, without the expense or practical need of requiring a feedback mechanism obtained from the receiver.

From FIGS. 14 and 15 it can be seen that in these embodiments, the optical digital signal and the analog one are coupled using an optical coupler in the form of a three port device with an electrically controlled variable optical power ratio. The electrically controlled variable optical power coupler may be realized using commercially available variable optical couplers.

In embodiments using a variable ratio optical coupler, the variable ratio optical coupler may be controlled based on the analog signal, or a monitored component of the analog signal. The variable ratio optical coupler may be controlled at periodic intervals to adjust the power ratio of the digital and analog signals being combined.

As an alternative to comparing the analog signal with variable minimum and maximum values in FIGS. 14 and 15, it is noted that the analog signal may also be compared with a fixed or predetermined threshold for the maximum and/or minimum.

According to another embodiment, there is provided a computer program, comprising instructions which, when executed on at least one processor, causes the at least one processor to carry out the method according to any one of the embodiments above, and as claimed in the appended claims.

According to another embodiment, there is provided a carrier comprising a computer program as described above, wherein the carrier is one of an electronic signal, optical signal, radio signal or computer readable storage medium.

The embodiments described above provide a method and apparatus to realize an analog/digital multiplexing of compact spectrum analog signals (e.g. radio HSPA/LTE) with a broadband baseband digital signal with notches in the power spectrum (e.g. GbE).

The intermediate frequencies for the compact spectrum signals may be chosen to match the notches in the broadband digital signal spectrum so that the mutual interference can be reduced.

Electrical and optical multiplexing options to realize the transmitter are possible, with a common front-end able to receive both the signals.

The examples described above have the advantage of enabling 3GPP signals to be transported as they are up to a centralized baseband processing site, while on the contrary other network traffic, such as Wi-Fi traffic, can be terminated at the small-cell site and Ethernet backhauled.

The embodiments therefore provide solutions which are able to combine digital Ethernet signals, e.g. generated by Wi-Fi, with analog signals that should be processed at a centralized baseband site, thus taking benefit from interference mitigation and in general from radio coordination.

The embodiments take advantage that digital signals, and in particular Ethernet signals, are much more robust to noise compared with analog ones (e.g. by using line coding) and their performance are unchanged also in case of high level of noise, such as the addition of the 3GPP analog signals.

The embodiments described herein have an advantage of allowing a common infrastructure (for example an optical fiber) to be able to operate as a "fronthaul" for 3GPP signals that require radio coordination and as a "backhaul" for Ethernet signals, e.g. Wi-Fi.

The embodiments also enable more 3GPP signals for multi-carrier support and for high order MIMO (Multiple Input Multiple Output) to be hosted on a single Ethernet stream, using multiple notches of the Ethernet signal.

The embodiments also have the advantage of enabling an already in place Ethernet infrastructure to be upgraded to carry one or more analog signals, such as 3GPP signals. For example, no changes are required in the GbE transmitter that operates as if the 3GPP signals are an additional noise source.

The embodiments also have the advantage that laser sources for digital and analog portions of the multiplexed signals are low cost, because they can be un-cooled and low power (e.g. VCSELs).

The embodiment also enable a common optical front-end (in case of optical medium) for digital and analog portions of the multiplexed signal.

Functional blocks, such as that of a Radio Dot System, may also be reused to generate the analog signal intermediate frequency (IF) and for signal processing (e.g. frequency down/up conversion, equalization, Automatic Gain Control (AGC)).

It is noted that the hybrid multiplexing described in the embodiments above may also be extended to any type of media (for example copper in addition to fiber) and with different multiplexing options.

Although the embodiments have been described as a hybrid multiplexing system for GbE signals (generally used to backhaul Wi-Fi and local area networks traffic), it is noted that the embodiments could be extended to any digital signal that presents notches in the power spectrum (e.g. digital baseband signals).

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a node of a telecommunication network, the method comprising:
   receiving a digital communication signal from a first signal source, wherein the digital communication signal comprises a plurality of low amplitude windows and wherein each of the plurality of low amplitude windows corresponds to a respective notch in a frequency spectrum of the digital communication signal;
   receiving one or more analog subcarrier signals from a second signal source; and
   multiplexing the one or more analog subcarrier signals into one or more of the plurality of low amplitude windows of the digital communication signal.

2. The method of claim 1, wherein a plurality of analog subcarrier signals are multiplexed into each of one or more low amplitude windows of the digital communication signal.

3. The method of claim 1, wherein the plurality of low amplitude windows are periodic.

4. The method of claim 1, wherein the one or more analog subcarrier signals to be multiplexed into the one or more low amplitude windows of the digital communication signal are determined according to one or more of the following criteria:
   the central frequency and bandwidth of a low amplitude window;
   the bandwidth of each analog subcarrier signal;
   the total number of analog subcarrier signals;
   the required dynamic range and/or noise tolerance of each analog subcarrier signal;
   the minimum signal to noise ratio tolerated by a digital receiver coupled to receive the multiplexed signal.

5. The method of claim 1, wherein the one or more analog subcarrier signals comprise telecommunication radio signals and/or wherein the digital communication signals comprise local network communication signals.

6. A non-transitory computer-readable medium comprising, stored thereupon, a computer program comprising instructions that, when executed on at least one processor, causes the at least one processor to carry out the method according to claim 1.

7. The method of claim 1, wherein the notches in the frequency spectrum of the digital communication signal have respective depths of at least 20 dB below an average spectrum between a respective notch and a nearest neighboring notch.

8. The method of claim 1, wherein the digital communication signal is a GigaBit Ethernet signal.

9. The method of claim 3, further comprising the step of selecting an intermediate frequency used to up convert the analog subcarrier signals such that the intermediate frequency matches the periodicity of the low amplitude windows of the digital communication signal.

10. A multiplexer apparatus comprising:
    a combining module comprising:
    a first input node coupled to receive a digital communication signal from a first signal source, wherein the digital communication signal comprises a plurality of low amplitude windows and wherein each of the plurality of low amplitude windows correspond to notches in a corresponding frequency spectrum of the digital communication signal; and
    a second input node coupled to receive one or more analog subcarrier signals from a second signal source;
    wherein the combining module is configured to multiplex the one or more analog subcarrier signals into one or more of the plurality of low amplitude windows of the digital communication signal; and
    an output node to output the multiplexed signal.

11. The multiplexing apparatus of claim 10, wherein the combining module comprises an electrical combining module for combining an electrical digital communication signal with one or more electrical analog subcarrier signals.

12. The multiplexing apparatus of claim 10, further comprising an optical transmitter for converting the combined one or more analog subcarrier signals and digital communication signal into a combined optical signal for transmission over an optical transmission medium.

13. The multiplexing apparatus of claim 10, wherein the combining module comprises an optical combining module for combining an optical digital communication signal with one or more optical analog subcarrier signals.

14. The multiplexing apparatus of claim 11, wherein the electrical combining module comprises a power coupler.

15. The multiplexing apparatus of claim 13, wherein the optical combining module comprises an optical coupler.

16. The multiplexing apparatus of claim 13 further comprising:
    a linear optical transmitter configured to convert one or more received electrical analog subcarrier signals into one or more analog optical subcarrier signals received by the optical combining module; and
    a digital optical transmitter configured to convert a received electrical digital communication signal into an optical digital communication signal received by the optical combining module.

17. The multiplexing apparatus of claim 15, wherein the optical coupler comprises a variable ratio optical coupler, for dynamically controlling the power ratio of the digital and analog signals.

18. The multiplexing apparatus of claim 17, further comprising a controller, wherein the controller is configured to:
    control the variable ratio optical coupler based on the analog signal, or a monitored component of the analog signal; or
    control the variable ratio of the optical coupler based on comparing the analog signal with variable minimum and maximum values of the analog signal; or
    control the variable ratio of the optical coupler based on comparing the analog signal with fixed or predetermined threshold values for maximum and/or minimum values of the analog signal.

19. The multiplexing apparatus of claim 18, wherein the controller is further adapted to control the variable ratio optical coupler at periodic intervals to adjust the power ratio of the digital and analog signals being combined.

20. A receiver comprising:
    a demultiplexing module, the demultiplexing module comprising:
    an input node coupled to receive a combined signal comprising a digital communication signal and one or more analog subcarrier signals;
    a first output node to output the digital communication signal; and
    a second output node to output the one or more analog subcarrier signals;
    wherein the demultiplexing module is configured to separate the digital communication signal from the one or more analog subcarrier signals by detecting the one or more analog subcarrier signals within one or more low amplitude windows of the digital communication signal, each of the one or more low amplitude windows corresponding to respective one or more notches in a frequency spectrum of the digital communication signal.

21. A receiver as claimed in claim 20, wherein the demultiplexing module comprises a power divider.

22. A method in a receiver node of a telecommunication network, the method comprising:
receiving a combined signal comprising a digital communication signal and one or more analog subcarrier signals; and
separating the digital communication signal from the one or more analog subcarrier signals by detecting the one or more analog subcarrier signals within one or more low amplitude windows of the digital communication signal, each of the one or more low amplitude windows corresponding to respective one or more notches in a frequency spectrum of the digital communication signal.

23. The method of claim 22, wherein the step of separating comprises passing the combined signal through a power divider to separate the digital and one or more analog signals.

24. A network node comprising a processor and memory, said memory containing instructions executable by said processor, whereby said network node is operative to:
receive a digital communication signal from a first signal source, wherein the digital communication signal comprises a plurality of low amplitude windows and wherein each of the plurality of low amplitude windows corresponds to a respective notch in a frequency spectrum of the digital communication signal;
receive one or more analog subcarrier signals from a second signal source; and
multiplex the one or more analog subcarrier signals into one or more of the plurality of low amplitude windows of the digital communication signal.

* * * * *